Jan. 28, 1947. P. SCHLUMBOHM 2,414,902
HANDLE FOR COFFEE MAKERS
Filed May 19, 1943
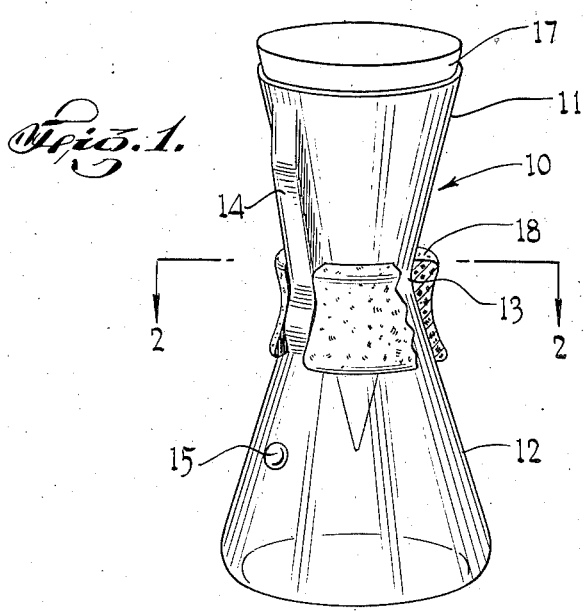
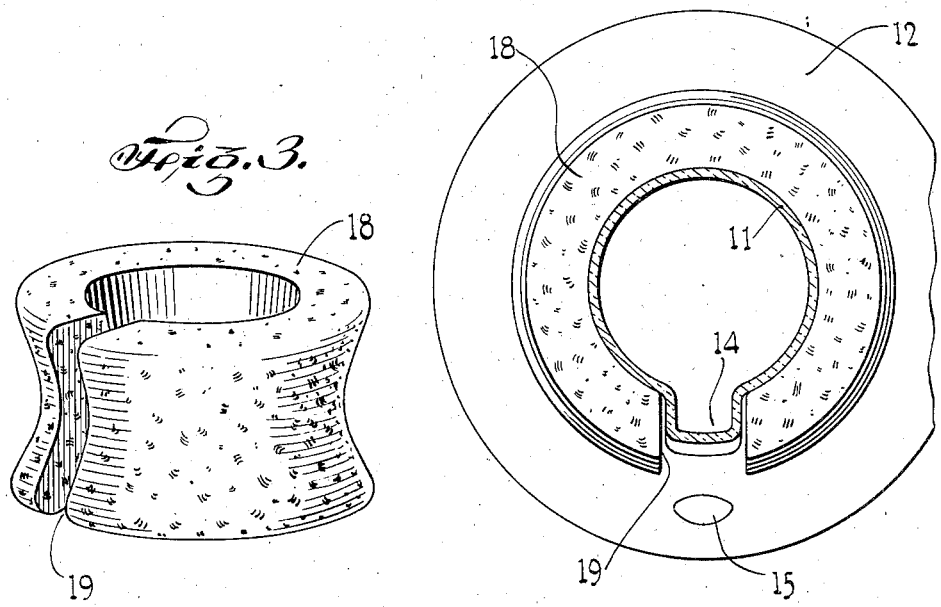
INVENTOR.

Patented Jan. 28, 1947

2,414,902

UNITED STATES PATENT OFFICE 2,414,902

HANDLE FOR COFFEE MAKERS

Peter Schlumbohm, New York, N. Y.

Application May 19, 1943, Serial No. 487,665

1 Claim. (Cl. 215—100)

The present invention refers to a handle for the neck of a flask and the object of the invention is more specifically to create a detachable, heat insulating handle for a glass coffee maker.

The invention is illustrated, by way of example, in Figure 1 to Figure 3 of the accompanying drawing.

Figure 1 shows in perspective view a glass coffee maker and illustrates partly in perspective view, and partly in section the handle of the invention.

Figure 2 is a cross-section taken on line 2—2 of Figure 1.

Figure 3 is a perspective view of the handle alone.

In the example of Figure 1 the coffee maker is an hourglass shaped glass bowl 10 and the upper part 11 is conical and serves as filter funnel for receiving a paper cone 17. The lower part 12 also is conical and of the shape of an Erlenmeyer flask. The vent groove 14 and a level mark 15 are molded in the wall of this filter pot 10. A neck restriction 13 is formed where the apexes of the two conical parts meet.

The vent groove 14 serves also as pouring spout when the flask is tilted. The handle 18 is designed to allow a firm center grip by the hand, while at the same time insulating the hand against the temperature of the hot coffee. I had previously built such a handle from wood, by applying stave like segments and binding them together by a loop.

The present invention makes it possible to make the handle as one piece which will lock itself and hold itself in the neck restriction space.

Following the invention I make the handle from a very resilient material, and I found cork the best suitable material of all resilient materials. Speaking of cork I mean the type of cork which is known as "composition cork." This cork is on the market in the form of slabs which have been produced by compressing ground cork and which can be fabricated like wood, for instance, by turning on a lathe.

Figure 2 is drawn to scale to give an idea of the extent of the resilience obtained. A handle of the shape as shown in Figure 3, with a heighth of 1½ inches and with an inside bore of 1¾ inches at its narrowest diameter may have a gap of the dimensions as shown in Figure 2, just enough to leave space for the groove 14 which is ⅝ inch wide; and such a cork ring may still be stretched to flip over the body of the filter flask 10. The groove 14 works as a key and the gap 19 as a key way to lock the handle 18 against side slip. Due to the double cone shape of the filter flask walls in the zone of the neck 13, in cooperation with the inside bore of conical shape of the handle 18 there will be no slip vertically either. For the specific purpose of a heat insulating handle for a coffee maker made from glass, cork has as additional desirable qualities of a high friction between glass and cork, and of a high insulating value. In this respect it is superior to rubber which otherwise also could be considered as a sufficiently resilient material to make such a handle.

I claim as my invention:

A flask and flask handle combination comprising a collar-like handle, a flask having a circular neck of restricted diameter from which a narrow projection extends horizontally, portions of said flask flaring out upwardly and downwardly from said neck, said handle being of resilient heat insulating material and having a generally convex profile in vertical section on its inner surface and a generally concave profile in vertical section on its outer surface, said inner surface extending about said neck beginning on one side of said narrow projection and ending on the other side of said narrow projection so that the gap between the beginning and end of said handle generally corresponds to the width of said projection, whereby said resilient collar-like handle may be readily sprung on to the neck of the flask with the gap in the handle associated with said narrow projection and when the handle is so associated with said flask it will lock itself in place and be prevented from rotating about said flask and prevented from moving upwardly or downwardly, said handle being of a size large enough to be gripped by the hand of the user.

PETER SCHLUMBOHM.